(12) United States Patent
Graffius

(10) Patent No.: US 11,785,904 B2
(45) Date of Patent: Oct. 17, 2023

(54) SELF-REGULATING WATERING INSERT FOR A PLANT CONTAINER

(71) Applicant: Earl B. Graffius, Macon, GA (US)

(72) Inventor: Earl B. Graffius, Macon, GA (US)

( * ) Notice: Subject to any disclaimer, the term of this patent is extended or adjusted under 35 U.S.C. 154(b) by 0 days.

(21) Appl. No.: 17/145,305

(22) Filed: Jan. 9, 2021

(65) Prior Publication Data

US 2021/0127606 A1 May 6, 2021

Related U.S. Application Data

(63) Continuation-in-part of application No. 15/861,614, filed on Jan. 3, 2018, now abandoned.

(51) Int. Cl.
*A01G 27/02* (2006.01)
*A01G 27/00* (2006.01)

(52) U.S. Cl.
CPC ........... *A01G 27/02* (2013.01); *A01G 27/008* (2013.01)

(58) Field of Classification Search
USPC ............... 47/79, 81, 48.5, 80, 85, 65.5, 66.6
See application file for complete search history.

(56) References Cited

U.S. PATENT DOCUMENTS

| | | | | |
|---|---|---|---|---|
| 2,834,153 A | * | 5/1958 | Fearn ..................... | A01G 9/02 47/66.2 |
| 4,212,134 A | * | 7/1980 | Brokamp ............... | A01G 9/027 47/82 |
| 4,270,309 A | * | 6/1981 | Baumann ............. | A01G 27/008 47/79 |
| 4,916,858 A | * | 4/1990 | Hobson .................. | A01G 27/04 47/81 |
| 5,107,621 A | * | 4/1992 | Deutschmann, Sr. ...... | A01G 27/008 47/79 |
| D328,725 S | * | 8/1992 | Deutschmann, Sr. ........... | 47/75 |
| 5,168,664 A | * | 12/1992 | Deutschmann, Sr. ...... | A01G 27/008 47/79 |
| D463,323 S | * | 9/2002 | Rose .......................... | D11/152 |
| 2004/0010970 A1 | * | 1/2004 | Baumann ............... | A01G 27/04 47/65.5 |
| 2011/0000130 A1 | * | 1/2011 | Miller ...................... | A01G 9/02 47/65.5 |

(Continued)

FOREIGN PATENT DOCUMENTS

JP 04367489 A * 12/1992 ............. B65D 90/02

*Primary Examiner* — Andrea M Valenti
(74) *Attorney, Agent, or Firm* — The Sladkus Law Group

(57) ABSTRACT

Disclosed is a self-watering insert for placement within a plant container, the insert comprising a one-piece self-supporting structure having an open bottom end, a closed top end, downwardly-sloping sidewalls, an open or closed inter-facing structure that facilitates a secure seal of the insert against an interior wall of the plant container, an open collar on the top to allow temporary insertion of a pipe or water-discharging mechanism into the watering insert, a plurality of holes and/or screen/fabric material permanently attached to the surface of the top end, allowing water and air to pass through the surface. A lower flange extends circumferentially around the bottom end of the water insert, thereby creating a shelf upon which growing medium rests; the flange further featuring downward protruding fins spaced so as to provide channels through which water passes from underneath the interior of the watering insert to its exterior.

20 Claims, 6 Drawing Sheets

(56) References Cited

U.S. PATENT DOCUMENTS

Figure 1:
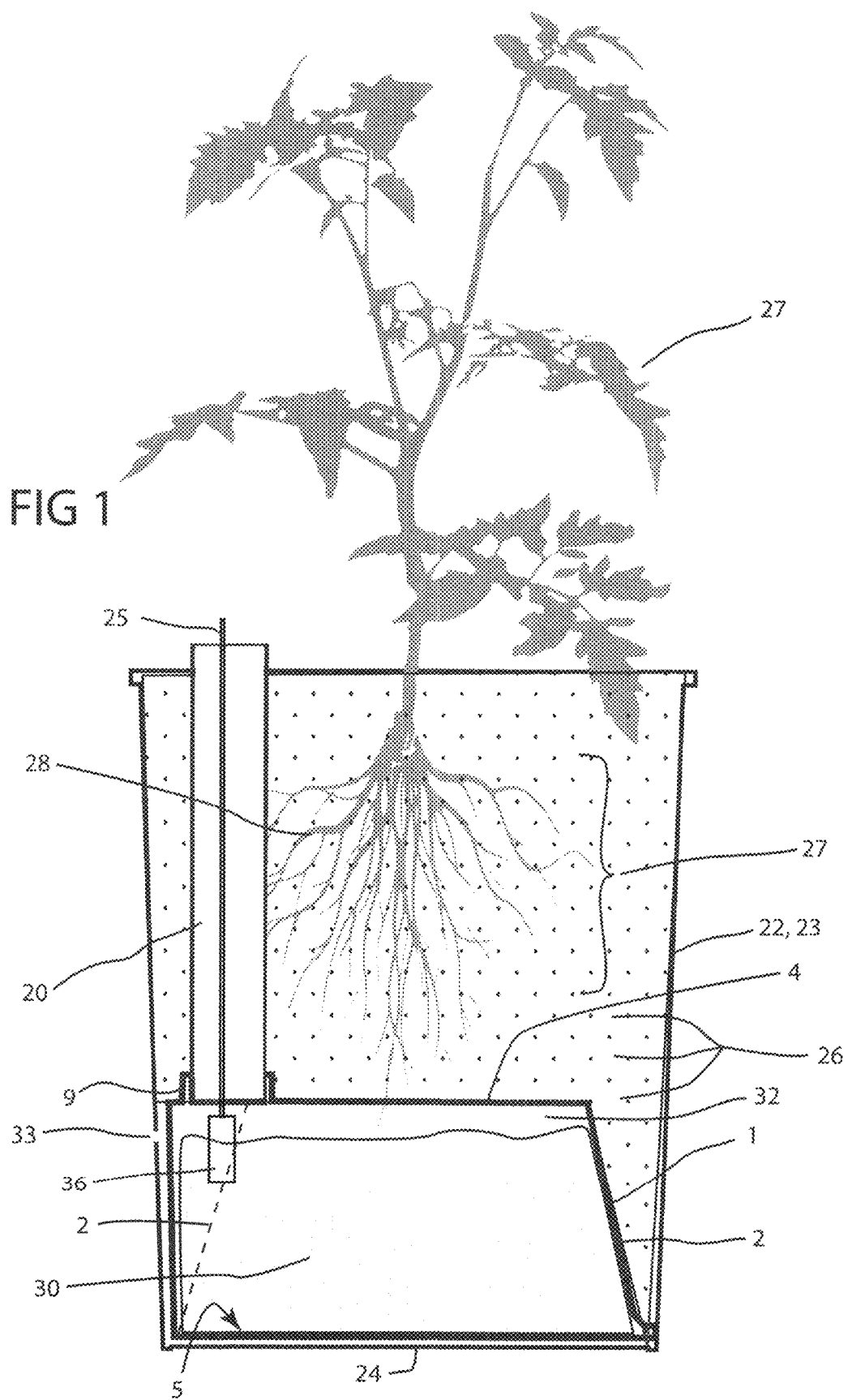

2011/0120000 A1* 5/2011 Ogilvie .............. A01G 13/0256
47/31.1
2011/0308152 A1* 12/2011 Harley ................... A01G 25/00
47/48.5
2018/0125013 A1* 5/2018 Holby ....................... A01G 9/02

* cited by examiner

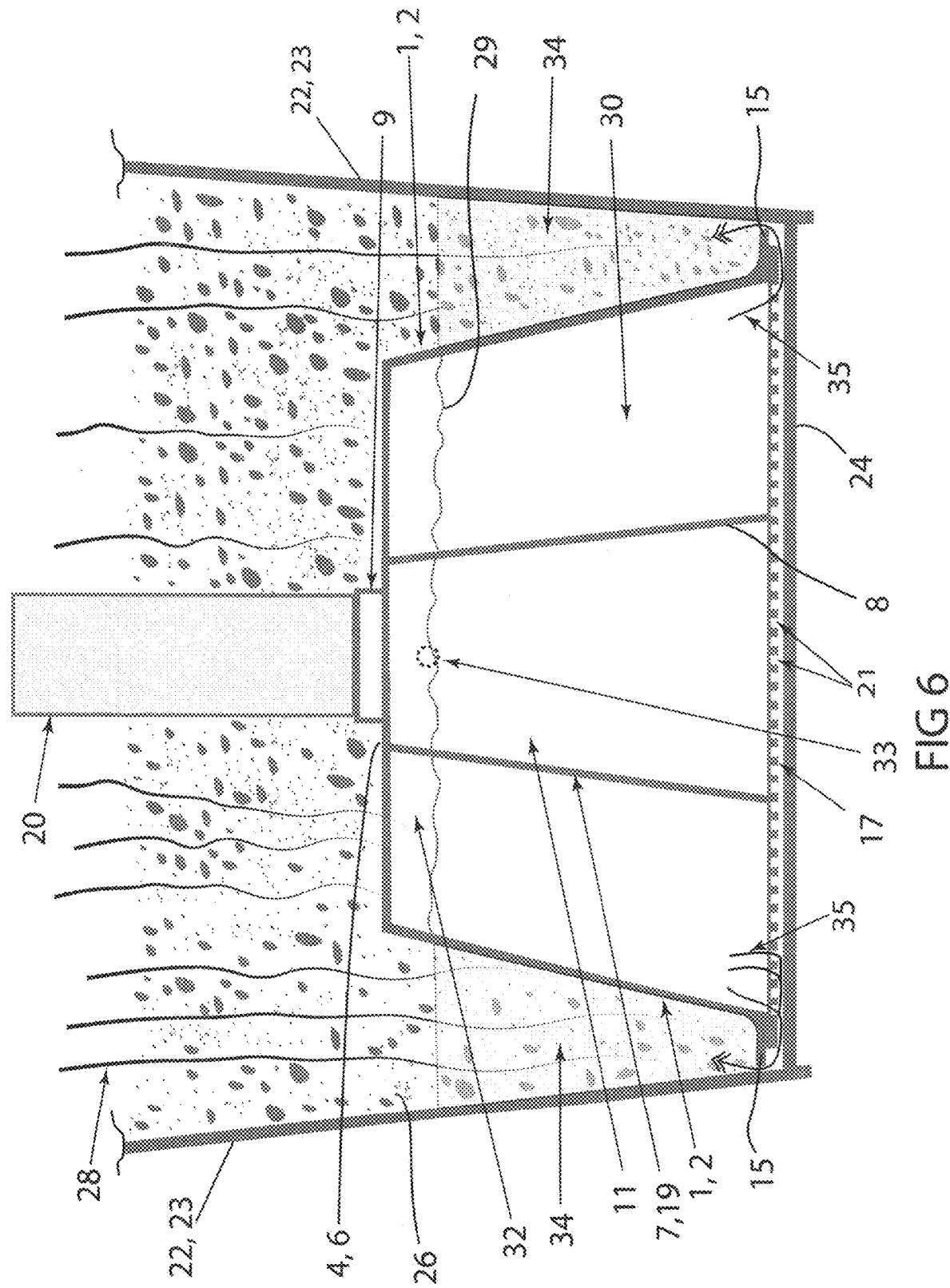

SELF-REGULATING WATERING INSERT FOR A PLANT CONTAINER

CROSS-REFERENCES TO RELATED APPLICATIONS

This patent application claims the benefit of priority from previously-filed U.S. provisional patent application, Ser. No. 62/441,562, filed on Jan. 3, 2017, and further, claims the benefit of content of said provisional application as though fully appearing herein. This patent application also claims the benefit and priority of U.S. Published patent application Ser. No. 15/861,614, filed on Jan. 3, 2018 and further claims the benefit of the content of this patent application Ser. No. 15/861,614.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

Self-watering containers allow plants to go extended periods of time without having to be watered by means of providing a reservoir to hold water and deliver the water to the plants as needed. The problem with most of these systems is they require the buyer to purchase the container and self-watering device together. These systems are very bulky and expensive. Most retailers are not going to set aside valuable shelf space for such bulky items. The bulk of these items also make them more expensive to ship, transport, and warehouse.

The "prior art" systems are also bulky to store when the growing season is over. This results in a need to have a device that allows common containers such as standard 5-gallon buckets to be converted in to self-watering planters. One object of the present inventive concept is to render planters more affordable and provided profiles and dimensions to make both the container and watering device stackable. This will result in the use of minimal storage space in the off-season. The disclosed inventive device will also minimize retail shelf space, storage space, warehousing space, and shipping costs associated with marketing and selling of the device.

There exist similar devices and methods to convert common containers into self-watering planters. Some of these devices and methods also fulfill the need to be compact and easy to store, ship, and warehouse. However, the problem with most of these devices and methods is that they are complex to use and/or require assembly and disassembly before and after use. Many of the current and prior art systems require that either the device be modified before use, assembled, or that other materials such as wicks be used to accomplish their intended function. The present inventive concept meets the need for a device that requires no modification, assembly, or the requirement of other materials to accomplish its intended function.

(2) Description of the Related Art, Including Information Disclosed Under 37 CFR 1.97 and 1.98

There are a limited number of devices that show features similar to the inventive concept disclosed. Among them are the following:

U.S. Pat. No. 2,834,153; Fearn, William H.; May 13, 1958. Disclosed and claimed is a ventilator cone for use in the lower part of a flowerpot and adapted to be positioned over the opening in the bottom thereof, comprising an annular rim having spacing nodes extended from the undersurface, a wall having an intermediate portion of interfaced strips extended upwardly from the upper edge of the rim, and an imperforate cone extended from the upper edge of the wall to the apex of the device.

U.S. Published Patent Application #2015/0164010; Jun. 18, 2015. This device is a disclosure of a one-piece drop-in device which converts buckets into self-watering container systems used for growing plants.

U.S. Pat. No. 9,161,500; Oct. 20, 2015, which discloses a self-watering system for a potted plant comprising a liquid container and an insert with an in-use position against the potted plant pointing upper part extending at least partially through an opening in the pot bottom.

U.S. Pat. No. 8,381,441; Feb. 26, 2013, which discloses an insertable watering device for a standard bucket, comprising a circular planar base member, central chamber, plurality of wicks, fill tube, and support legs.

U.S. Pat. No. 8,146,292; Brandstatter, C.; Apr. 3, 2012; The invention relates to an insert container for plant pots with a base, at least one side wall, which adjoins the base with a lower edge, is formed with an upper edge open at the top and surrounds an interior, a longitudinal axis extending perpendicular to the base, supports arranged on the base and extending in the direction of the longitudinal axis, at least one water-permeable watering device arranged on the base and at least one indentation which extends in the direction of the longitudinal axis, in the at least one side wall.

U.S. Pat. No. 7,856,755; Dec. 28, 2010. The device disclosed is a planter system comprising of at least a water retaining vessel, bedding material layer, structure surrounding the retaining vessel and at least one fill tube, all components in a working combination.

U.S. Published Patent Application #2018/0125013/A1; Holby, Israel; May 10, 2018; A container for a plant may include a base having an axis, and a sidewall configured to be rotationally attached to the base about the axis to form the container. The sidewall may be configured to surround a portion of the base and extend axially upward from the base.

BRIEF SUMMARY OF THE INVENTION

The present invention, known as the "GroBucket," discloses a stackable one-piece self-supporting watering insert 1 which displaces growing medium or soil 26 that surrounds a container-bound plant. In this manner, a water reservoir 30 is created. The GroBucket is a soil displacement device designed with an essentially perforated top end 4 and an entirely open bottom end 5. The GroBucket utilizes its bottom end 5 to fit flush onto the floor 24 of a plant container 22 into which it is placed. This arrangement is seen more readily in FIG. 1 and FIG. 2, following.

More particularly, the watering insert 1 provides (a) an opening for water 29 and air to enter the reservoir 30, (b) an upper surface 12 at the top end 4 of the watering insert 1 with a plurality of openings which allow airflow to the root 28 system, (c) side walls 2 to separate the watering insert 1 from the interior wall 23 of the plant container 22, and (d) a side opening or mouth 11. The mouth 11 is contained within an interface structure 19, the mouth 11 comprising a right leg 7, left leg 8, and horizontal ledge 6, which collectively seals the mouth 11 against the interior wall 23 of the plant container 22.

A collar 9 constructed atop the horizontal ledge 6 of the mouth 11 creates a receptacle for a pipe 20 to extend from above the watering insert 1, vertically through the top end 4, thereby providing access for insertion of water 29 into the reservoir 30.

The sealing configuration of the mouth 11 allows side access to the water reservoir 30 directly through the watering insert 1. The geometric construction of the base 3 and bottom end 5 features a circumferential flange 15 having a shelf 16 as its upper surface, and radially extending fins 17 forming a plurality of gaps, or water channels 21. The water channels 21 allow water 29 to flow from the bottom end 5 of the watering insert 1 and be wicked into the growing medium or soil 26.

The preferred embodiment of the watering insert 1 features an overall contour similar to an inverted cuplike structure. This is the result of a circumferential, sloping sidewall 2 continuously projecting downward from the top end 4. It is to be noted that other embodiments of the watering insert 1 may comprise a variety of geometric contours and shapes, including box-shaped, rectangular-shaped, oval-shaped, or other contours and shapes which correspond directly with the interior of any specific plant container 22.

BRIEF DESCRIPTION OF THE VIEWS OF DRAWINGS AS EXEMPLARY EMBODIMENTS OF THE INVENTIVE CONCEPT

Figure 3:
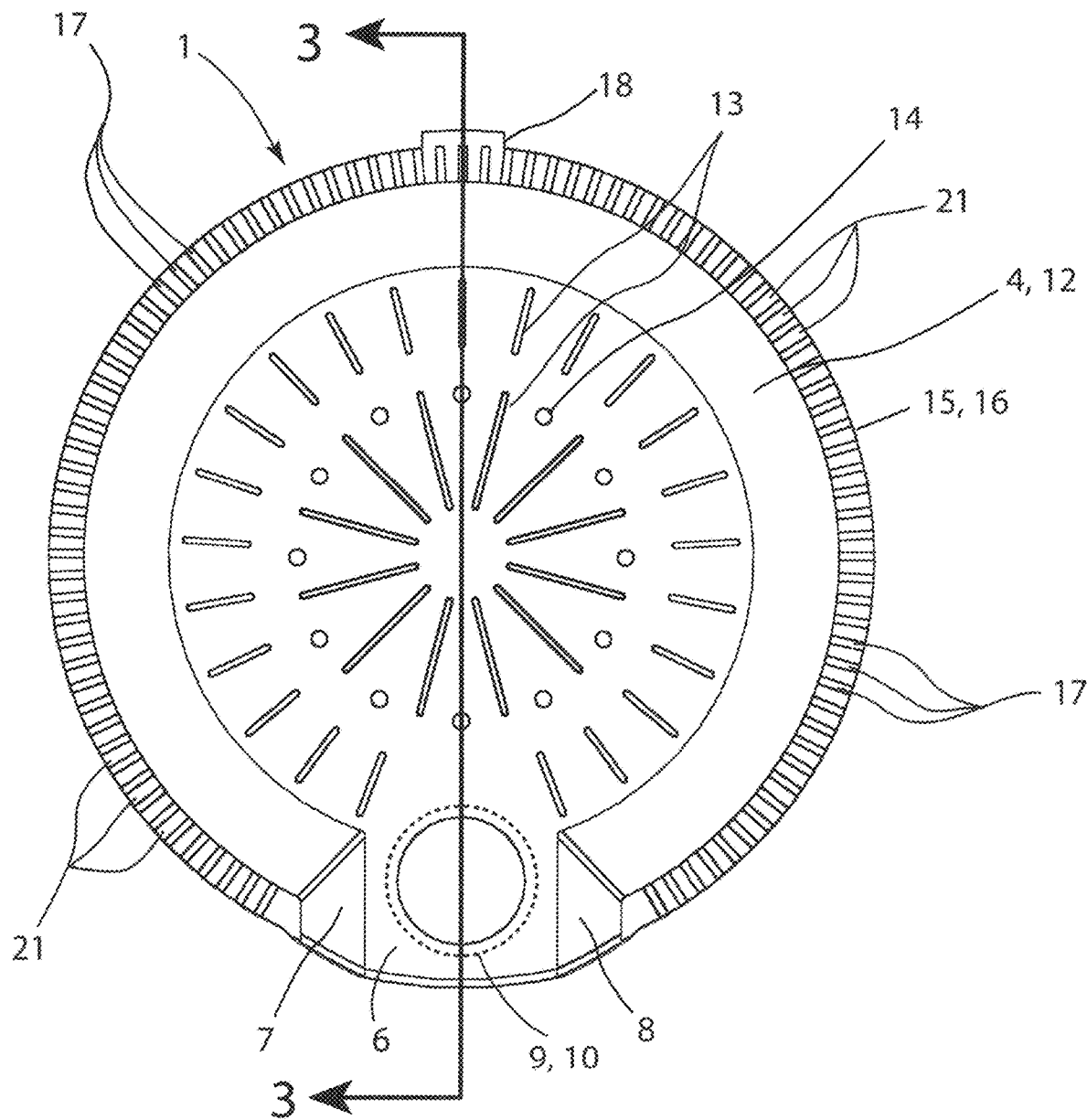

FIG. 1 illustrates a sectional side view of the watering insert 1 as seen from the perspective of section line 3-3 of FIG. 3. FIG. 1 further displays a typical plant 27 placed within growing medium, or soil 26, all materials being placed in a bucket-like container 22. Further shown is a float 36 and a water level indicator 25 inserted within a pipe 20.

Figure 2:
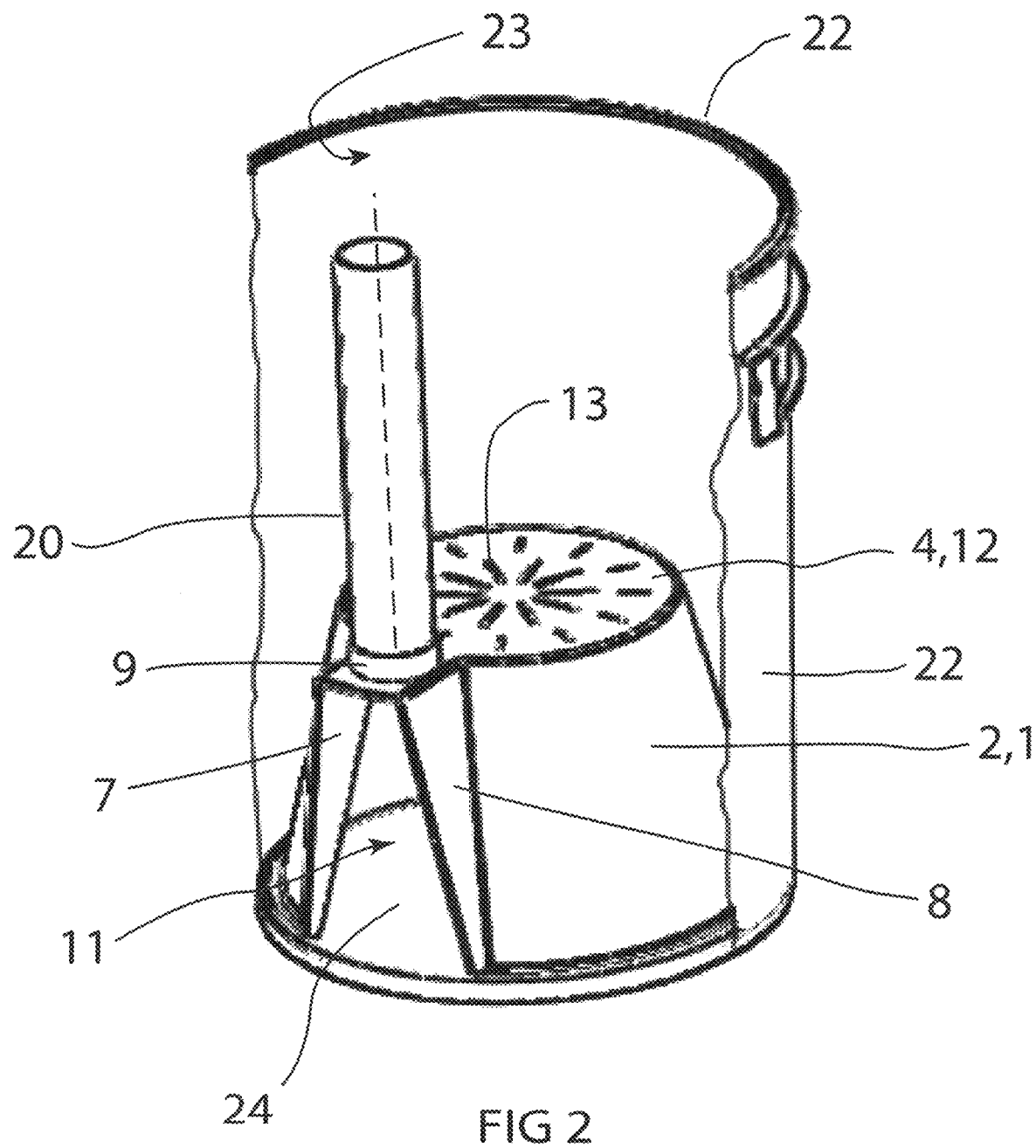

FIG. 2 depicts a cut-away view of the preferred embodiment of the watering insert 1 placed within a typical plant container 22, prior to the infusion of growing medium or soil 26. The overall contour of the Gro Bucket device is shown to be an inverted cuplike structure having tapered sidewalls 2.

FIG. 3 shows a view of the bottom end 5 of the preferred embodiment of the watering insert 1, in which apertures 14, holes, and oblong slots 13 constructed into the upper surface 12 of the top end 4, of the watering insert 1 are visible.

Figure 4:
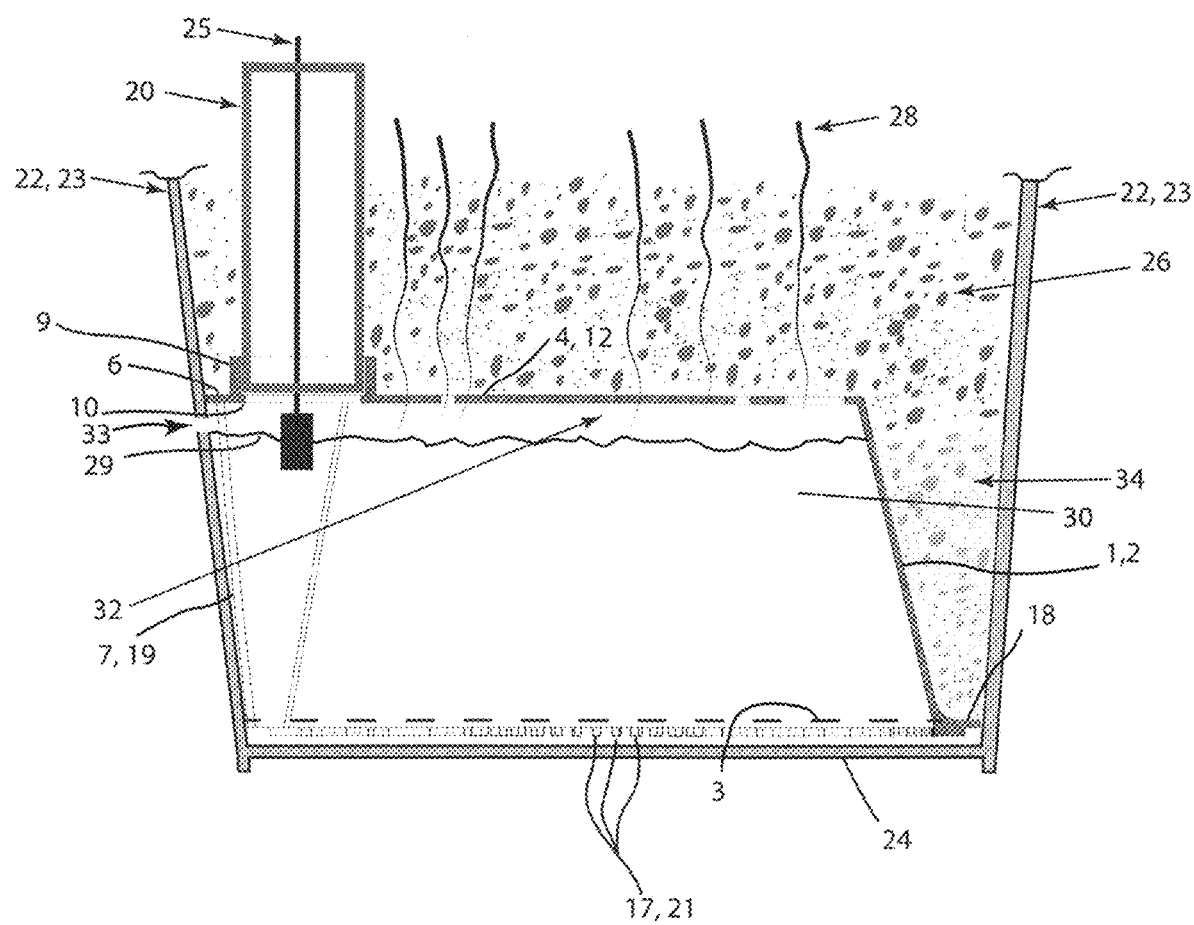
Figure 5:
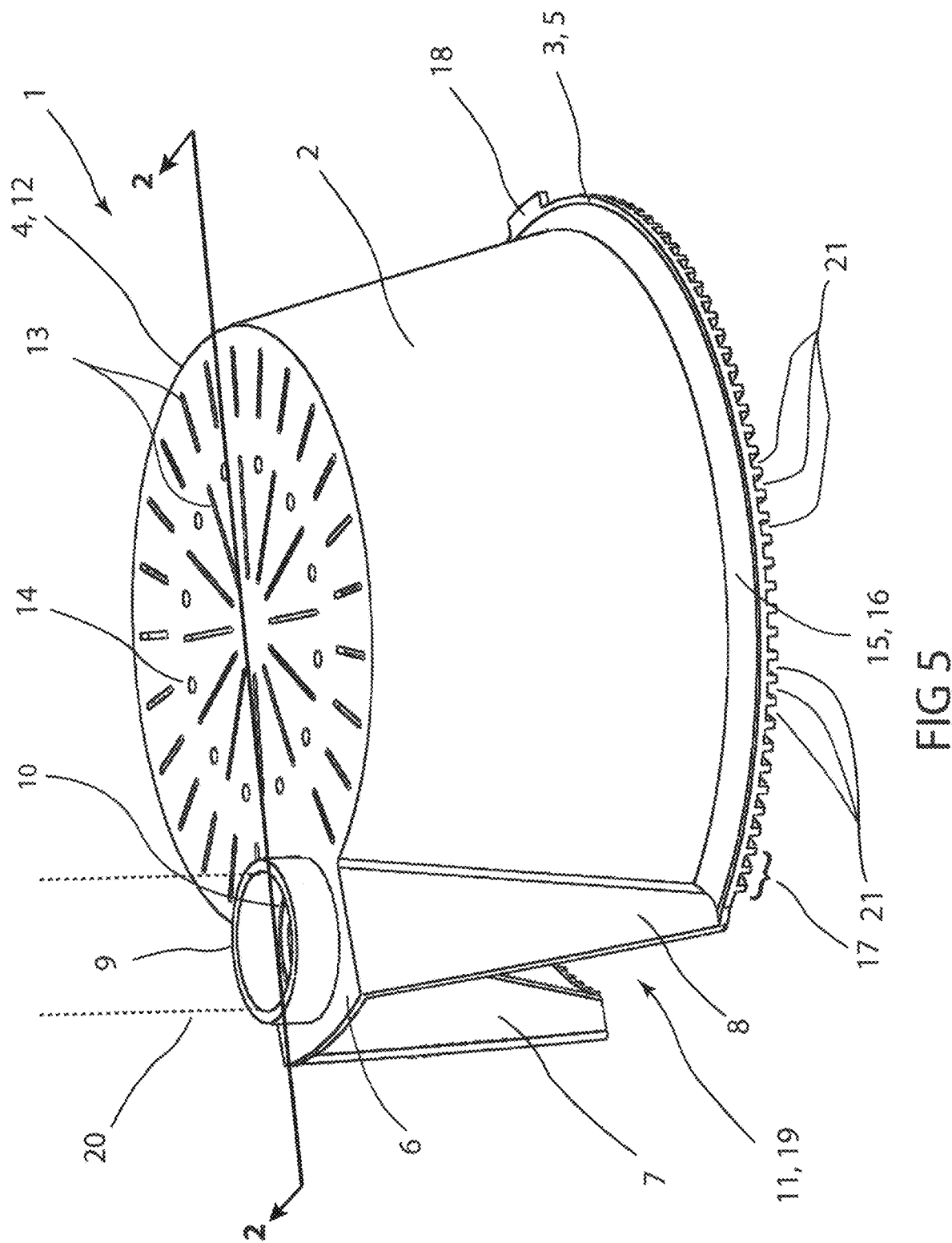

FIG. 4 presents a cross-sectional view of the Gro Bucket in accordance with section lines 2-2 of FIG. 5. The watering insert 1 is depicted as having been inserted into a typical plant container 22, complete with soil 26 or growing medium placed atop and around the watering insert 1. The roots 28 of a plant 27 (not shown) are shown extending into the soil 26, the soil 26 further contained within the wall 23 of the plant container 22. Further shown is a float 36 and a water level indicator 25 inserted within a pipe 20.

FIG. 5 presents a standalone view of the watering insert 1, further showing the area where the pipe 20 of the device would be attached interiorly to the collar 9. The top-to-bottom slope of the sidewall 2 is noted, along with bottom-most fins 17 which serve to create channels 21 for metered outward flow of water. The components of the interface structure 19 are illustrated.

FIG. 6 depicts a modified view, oriented ninety degrees clockwise of the view of FIG. 4. FIG. 6 illustrates the upward, pressurized water transfer path 35 through the water channels 21 of the watering insert 1, into the wetted area 34 of the soil 26. Further shown are plant roots 28, soil or growing medium 26, completely covering the watering insert 1, and the actual water level 29 within the water reservoir 30. Also shown is the overflow orifice 33, which causes of an air gap 32 directly underneath top end 4 of the watering insert 1.

| Table of Nomenclature & Part Numbers of Invention | |
|---|---|
| 1. | Watering insert |
| 2. | Sidewall |
| 3. | Base |
| 4. | Top end |
| 5. | Bottom end |
| 6. | Ledge |
| 7. | Left leg |
| 8. | Right leg |
| 9. | Collar |
| 10. | Lip |
| 11. | Mouth |
| 12. | Upper surface (solid or mesh) |
| 13. | Oblong hole, slot |
| 14. | Circular aperture |
| 15. | Flange |
| 16. | Shelf |
| 17. | Fin |
| 18. | Tab |
| 19. | Interface structure |
| 20. | Pipe |
| 21. | Water Channel |
| 22. | Plant container |
| 23. | Container wall |
| 24. | Container floor |
| 25. | Water Level Indicator |
| 26. | Soil/Growing Medium |
| 27. | Plant |
| 28. | Roots |
| 29. | Water/Water Level |
| 30. | Reservoir Area |
| 31. | Root Ball |
| 32. | Air Gap |
| 33. | Overflow Orifice |
| 34. | Wetted Area |
| 35. | Water Transfer Path |
| 36. | Float |

DETAILED DESCRIPTION OF THE INVENTION

The objects, features, and advantages of the inventive concept presented in this application are more readily understood when referring to the accompanying drawings. The drawings, totaling six figures, show the basic components and functions of embodiments and/or methods of use. In the several figures, like reference numbers are used in each figure to correspond to the same component as may be depicted in other figures.

One object of the watering insert 1 is to provide a bounty of mechanical and horticultural advantages for a user seeking the ultimate in plant nourishment and growth.

Another object of the inventive concept is that recycled plastic material may be used for construction, and colored black to prevent algae growth.

The discussion of the present inventive concept will be initiated with FIG. 1, a sectional side view of the watering insert, 1 as seen from the perspective of section line 3-3 of FIG. 3. The watering insert 1 is depicted being immersed in a plant container 22, the plant container further having soil 26, or a growing medium, shown supporting the root structure 28 of a plant 27. The soil 26 sits atop the watering insert 1 and also envelopes the circumferential sloping sidewall 2 of the watering insert 1. The interior of the container wall 23 contains and restrains the soil 26. In the preferred embodiment, the watering insert 1 is designed to precisely fit within a container being a common 5-gallon bucket.

A pipe 20 is affixed within a circular collar 9, the collar being attached to the top end 4 of the watering insert 1. The pipe 20 serves to contain a rod-like water level indicator 25 attached at is bottom end to a float 36. The water level indicator 25, being inserted within the pipe 20, serves to provide a user with an approximation of the volume of water with the watering insert 1.

FIG. 2 depicts a stylized cut-away view of the preferred embodiment of the watering insert 1 placed within a typical plant container 22. The overall contour of the GroBucket device is shown to be an inverted cuplike structure having tapered sidewalls 2. The view in FIG. 2 is depicted prior to the insertion of soil 26, along with a plant 27 into the plant container 22.

In FIG. 2 there is shown a collar 9 constructed to allow a pipe 20 to be attached to the top end 4 of the watering insert 1, and above the normal water level 29. The pipe 20 further permits air to be exchanged from outside the plant container 22. The pipe 20 also creates access for direct insertion of water into the plant container 22, as well as providing a space to hold a water level indicator 25 (shown in FIG. 1 and FIG. 4). Various sizes of pipe 20 can thus be attached to accommodate different size containers. Many current designs of plant containers have only an opening and the pipe extends into the water, which is eliminates the possibility of transfer of air between the top of the water level and the top of the opening.

FIG. 1 shows, on the upper surface 12 of the top end 4, a multiplicity of oblong holes 13 that (a) permit air from an air gap 32 (shown in FIG. 4 and FIG. 6) to enter the soil 26 and (b) excess water from the soil to gravity drain into the reservoir area 30. An overflow orifice 33 depicted in FIG. 1 and FIG. 4 provides an escape for excess water such that an air gap 32 is maintained. This also creates a maximum reservoir holding capacity.

An interface structure 19, Consisting of a left leg 7, a right leg 8, and a ledge 6, forms an open area referred to as a mouth 11 opening. The edges of the legs and ledge 7, 8, 6 must be placed abuttingly to an interior wall of the plant container 22. In some embodiments, the mouth 11 the interface structure 19 may be sealed shut, to further greater retention time of the water supply. Noting the base 3 of the watering insert 1 there is seen a flange 15 forming a horizontal shelf 16, which shelf provides a retention location for growing medium 26 that is inserted atop the watering insert 1. The shelf 16 accommodates the weight of growing medium 26 placed atop it and provides additional stability to the watering insert 1.

When the watering insert 1 is placed into a plant container 22, the interface structure 19, being diametrically opposite the tab 18, is thereby forced against the plant container 22, thus creating a tight seal between the plant container 22 and the mouth of the interface structure 19. In different embodiments of the inventive concept, the mouth 11 may be sealed shut by the providing of additional material to seal the left and right legs 7, 8, and the ledge 6.

FIG. 2 presents a cutaway sectional view of the watering insert 1 as seen from the perspective of section line 2-2 of FIG. 1. FIG. 3 is a bottom view of the watering insert 1 looking upwards. Predominantly visible in FIG. 3 is the bottom of the upper surface 12, further showing the plurality of oblong holes 13 and circular apertures 14. The lower opening of the collar 9 is shown as it is located upon the ledge 6. The symmetrically-spaced fins 17 of the flange 15 are shown as they are constructed directly beneath the shelf 16.

FIG. 3 displays a view looking upward through the bottom end 5 of the preferred embodiment of the watering insert 1, in which apertures 14, oblong holes 13, and oblong slots 13 constructed into the upper surface 12 of the top end 4, of the base 3 are visible. A tab 18 is constructed extending outward from the perimeter of the bottom end 5 of the watering insert 1. The tab 18 enables a firm fit of the vertical left leg 7 and right leg 8 of the watering insert 1 against the interior surface of the wall 23 of the plant container 22.

FIG. 4 depicts a cross-sectional view of the GroBucket, or watering insert 1 in accordance with section lines 2-2 of FIG. 5. The watering insert 1 is depicted inserted into a typical plant container 22, complete with soil 26 or growing medium placed onto the top end 4 of the watering insert 1 and dispersed around the sidewall 2 of the watering insert 1. The roots 28 of a plant 27 (not shown) are shown extending into the soil 26, the soil 26, or growing medium, is further contained within the wall 23 of the plant container 22. As shown, the roots 28 run practically the full depth of the plant container 22. The watering insert 1 is buried within the soil 26, which prevents any ultraviolet damage, as compared to outdoor use.

In FIG. 4, it is shown that the bottom surface of the flange 15 manifests a series of regularly-spaced fins 17 which provide channels 21 created between the fins 17 and the floor 24 of the plant container 22. This enables the movement of water from the reservoir area 30 of the watering insert 1 to effect wicking of water into the bottom layers of soil 26, thereby causing a wetted area 34 within the plant container 22.

A compatible hollow pipe 20 inserted into a collar 9 attached atop the ledge 6 of the watering insert 1 and extends up past the top of the soil 26 for the purpose of allowing access to the reservoir area 30 from the top of the planter for the purpose of watering, air transfer or accessories into the insert 1. A circular lip 10 restrains the pipe 20 from extending into the water assuring the free transfer of air between the air gap 32 through the pipe 20.

Viewing FIG. 4, it is seen that soil 26, or growing medium, is displaced in a more evenly distributed fashion, between the sidewall 2 and the container wall 23, thereby providing a greater wicking area for a plant 27. This also assists in preventing light interaction and algae growth. The distribution of the soil 26 further provides an insulating dirt barrier around the reservoir 30, thereby protecting the water 29 from freezing as quickly, if in outdoor use. The soil 26 insulates the contained water 29, preventing excess evaporation. The reservoir 30, being internally contained, also is a barrier against mosquitoes and insects.

The collar 9, shown in FIG. 4 of the watering insert 1, accepts insertion of a standard 1.25-inch PVC pipe 20, in the preferred embodiment. The collar 9 may be resized to accommodate different pipe sizes. Plant-nurturing accessories can be attached proximate the collar 9. The pipe 20 allows access by various accessories, such as water level indicator, directly to the reservoir area 30.

FIG. 5 presents a stand-alone perspective view of the watering insert 1, further showing the area where the pipe 20 of the device would be situated. The slope of the sidewall 2 is noted. An important interface structure 19 is formed by a horizontal ledge 6 intersecting the left leg 7 and right leg 8, shaping a mouth 11. The ledge 6 also provides the foundation for construction of a circular collar 9, the collar 9, enabling placement of a pipe 20 to provide a conduit for the supply of water to the interior of the watering insert 1. Also noticeable in FIG. 5 are a plurality of fins 17 which shape a multitude of water channels 21 underneath the flange 15 and shelf 16 of the watering insert 1. The channels 21 provide metered outward flow of water.

The channels 21 extend radially outward to allow water to flow out while preventing soil 26 from entering the reservoir 30. Without these channels 21, water flow would be severely inhibited, since a flat flange 15 would tend to seal up flush against the floor 24 of the plant container 22. It is to be noted that a tab 18 extends outward and provides a bracing action of the left leg 6 and right leg 7 against the interior wall of a plant container 22.

The mouth 11 shown in FIG. 5, as part of the interface structure 19, can be adjusted to accommodate different embodiments of the watering insert 1. Wider dimensions of the mouth 11 allows side-mounted accessories, such as water tubes and float valves, to be attached to supply continuous amounts of water. Other embodiments can allow for a smaller width mouth 11 corresponding to smaller planters that may only need space for an overflow orifice 33.

FIG. 6 depicts a modified view, oriented ninety degrees clockwise of the view of FIG. 4. FIG. 6 illustrates the upward, pressurized water transfer path 35 through the water channels 21 of the watering insert 1, into the wetted area 34 of the soil 26. Further shown are plant roots 28, soil or growing medium 26, completely covering the watering insert 1, and the actual water level 29 within the water reservoir 30. Also shown is the overflow orifice 33, which causes of an air gap 32 directly underneath top end 4 of the watering insert 1.

FIG. 6 depicts the watering insert 1 fully operational, within a plant container 22. The roots 28 of a plant 27 are shown engaged with soil 26 or growing medium within the plant container 22. Soil 26 completely covers the exterior surfaces of the watering insert 1. The exterior surfaces of the watering insert are shown to be the sidewall 2, the top end 4, ledge 6, the circumferential flange 15, the left leg 7, right leg 8, and the outer surface of the collar 9. Further, the actual water level 29, which simultaneously exists within the reservoir 30 and the plant container 22, is shown.

FIG. 6 depicts that the tapered sidewall 2 of the watering insert 1 can create a fillable space between the sidewall 2 of the watering insert 1 and the interior of the wall 23 of the plant container 22. This created space serves as a wetted area 34 where water is transferred, or wicked, from the bottom-most fins 17 of the watering insert 1 into the soil 26 or growing medium. Further, the taper on the sidewall 2 creates a geometry that allows multiple units of the watering insert 1 to stack and nest on each other in situations requiring commercial storage or shipping.

In FIG. 6, it can be seen that the tapered shape of the sidewall 2 of the watering insert 1 allows plant roots 28 to extend to the bottom of the container 22. This feature gives plants 27 more vertical space to grow and lowers the center of gravity of the plant container 22 for better stability to resist tipping. Also shown in FIG. 6 is an overflow hole 33 which is a relief outlet in the event of overfilling the reservoir 30 of the watering insert 1. Further shown in FIG. 6 are the radiating fins 17 which create channels 21 for the flow of water outward at the bottom end of the watering insert 1 onto the floor 24 of the plant container 22. The fins 17 also prevent soil intrusion into the water reservoir 30.

As can be seen, in FIG. 6, the weight of the soil 26 or growing medium upon the circumferential flange 15 presses the watering insert 1 onto the floor 24 of the plant container 22, thereby giving a stabilizing effect to the entire assembly.

Other operational notes and advantages of the disclosed watering insert 1 include the following:

The mouth 11 of the watering insert 1 seals against the interior wall 23 of a plant container 22, thereby separating the growing media or soil 26 and water 29. Further, the total height & contour of the watering insert 1 can be adjusted to provide different water reservoir 30 volumes in comparison to the volume of soil 26.

The interface structure 19 serves as both a water port and an air port.

The lower flange 15 and sidewall 2 of the watering insert 1 create a defined area to use filter material or aggregate for very loose soil 26 or to prevent soil 26 intrusion into the reservoir 30 area.

The watering insert 1 total volume occupies a large portion of a plant container 22, thereby relatively less soil 26 is needed. Further, the watering insert 1 is ideal for aquaponics or hydroponic use to create modular grow beds.

The design of the watering insert 1 inherently creates water pressure which pushes water 29 into the soil 26 bottom upwards, which assists in wicking.

The watering insert 1, having a circumferential wedge shaped wetted area 34 that is directly proportional to the reservoir water level 29, provides gradual and thus ideal conditions for wicking of the water 29 in the soil 26. Surround wicking provides better use of soil 26 rather than having a vertical column of soil 26, which provides only lateral wicking.

The inclined sidewalls 2 of the watering insert 1 serve as an aeration zone. The sidewall 2 creates a structure (similar to a pyramid) to distribute the weight of the soil 26 around the watering insert 1, increasing its overall strength and ability to hold heavy soil loads. Further, the downwardly declined sidewall 2 allows plant roots 28 to create a more stable anchoring for the plant 27, since the roots 28 are dispersed deeper into the plant container 22 and also spread out further horizontally.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Accordingly, it is intended that this inventive concept be inclusive of such variations, changes, and substitutions, as described by the scope of the claims presented herein.

What is claimed is:

1. A plant watering insert apparatus for placement into the interior of a plant container, the plant watering insert apparatus comprising:
   (a) an inverted cup-shaped structure having a sidewall and a top end, wherein the top end has a flat upper surface, and wherein a plurality of openings are defined through the top end;
   (b) the sidewall continuously sloping downward and away from the flat upper surface of the top end, the continuous sidewall having an upper end and a lower end, wherein the lower end of the sidewall defines an open bottom end of the inverted cup-shaped structure, and wherein a reservoir is defined by the top end, the continuous sidewall and the bottom end;

(c) a flat circumferential flange projecting outward and away from the lower end of the sidewall and terminating at an exterior perimeter edge, the flange configured for soil to be positioned thereon, and a plurality of fins symmetrically constructed under the flange such that the fins extend through an entire radial width of the flange, wherein the plurality of fins define a plurality of water channels that extend outward radially to allow water to flow out while preventing soil from entering the reservoir;

(d) a container interface structure comprising a mouth from the top end to the lower end in the sidewall forming an opening into the reservoir, the mouth formed by a right leg and a left leg extending from the sidewall away from the reservoir, wherein each leg is connected at an upper end to a horizontal ledge, and wherein the ledge has an upwardly extending circular collar;

(e) a cylindrical pipe vertically and removably attachable to an interior of the collar; and (f) a spacing tab positioned at the bottom end, and diametrically opposed to the container interface structure, wherein the spacing tab is coupled to and projects outward from the exterior perimeter of the flange to urge the container interface structure towards a sidewall of the plant container.

2. The plant watering insert apparatus of claim 1, wherein the plurality of openings comprise oblong holes, oblong slots, and circular apertures, all symmetrically spaced and arranged circumferentially around the top end, so as to effectuate aeration of the roots of a plant simultaneously located within the same plant container as the watering insert.

3. The plant watering insert apparatus of claim 1, wherein a rod having a float attached to a first end, and a water level indicator attached to its second end, is inserted with the first end downward, lengthwise into the cylindrical pipe.

4. The plant watering insert apparatus of claim 1, wherein upon addition of a quantity of water through the pipe thereof, there is formed a water reservoir within the confines of the watering insert, and simultaneously, creates bottommost water pressure within the watering insert.

5. The plant watering insert apparatus of claim 1, wherein an overflow orifice is constructed at a specific level into the sidewall of the plant container, such that any excess water flowing outward through the orifice forms an air gap underneath the surface of the top end.

6. The plant watering insert apparatus of claim 5, wherein the air gap is formed below the upper surface of the housing regardless of the amount of water poured into the plant container.

7. The plant watering insert apparatus of claim 1, wherein the flange is perpendicular to the sidewall of the plant container, wherein, upon placement of the apparatus into the interior of a plant container and filling of a quantity of soil or growing medium into the plant container, there is created an increased weight upon the flange, which results in anchoring and stabilizing the watering insert upon the interior floor of the plant container.

8. The plant watering insert apparatus of claim 1, wherein, (a) upon placement of the apparatus onto the floor of a plant container, (b) placement of a quantity of soil or growing medium about the entirety of the sloping sidewall of the watering insert; and (c) addition of a quantity of water via the pipe, there is thereby created a wetted area for watering of the roots of a plant inserted therein.

9. The plant watering insert apparatus of claim 1, wherein, (a) upon placement of the apparatus onto the floor of a plant container, (b) placement of a quantity of soil or growing medium about the entirety of the sloping sidewall of the watering insert; and (c) addition of a quantity of water via the pipe, said water channels allow stored water to escape such that there is created a wetted area for watering of the roots of a plant inserted therein.

10. The plant watering insert apparatus of claim 1, wherein a section of material is permanently attached to the edges of the ledge, the left leg, and right leg of the interface structure, thereby sealing the mouth to the interior wall of a plant container.

11. The plant watering insert apparatus as in claim 1, wherein the general shape and contour of the inverted cup-shaped structure consists of a shape selected from the group consisting of (a) a cuboid structure with walls and an open interior and (b) a rectangular-sided open container.

12. The plant watering insert apparatus as in claim 1, wherein the upper surface is formed from a mesh material.

13. The plant watering insert apparatus as in claim 1, further having the watering insert apparatus constructed with a black color for prevention of algae growth.

14. The plant watering insert apparatus of claim 1, wherein the spacing tab has a height equal to the height of the flange.

15. The plant watering insert apparatus of claim 1, wherein the exterior perimeter of the flange is spaced from the sidewall of the plant container by the spacing tab.

16. The plant watering insert apparatus of claim 1, wherein the flange is perpendicular to the sidewall of the plant container, wherein the flange is oriented so that the weight of soil exerts only a vertical, downward force to the flange, and wherein the only vertical, downward force applied to the flange seals the fins to the container.

17. A plant watering apparatus comprising
a plant container having a container sidewall and a container bottom that define a plant container interior; and
a plant watering insert apparatus configured to be positioned in the plant container interior, the plant watering insert apparatus comprising:
a housing having a flat, enclosed upper surface, a sidewall tapering downward and away from the upper surface to a bottom end such that the bottom end has a larger diameter than a diameter of the top surface, wherein the upper surface, the sidewall and the container bottom define an interior reservoir for storing water, and wherein a plurality of openings are defined in the upper surface so that water can pass through the plurality of openings and into the reservoir;
a flat circumferential flange projecting outward radially from the lower end of the sidewall and terminating at an exterior perimeter edge, wherein a plurality of fins are positioned under the flange such that the fins extend through an entire radial width of the flange, and wherein the plurality of fins define a plurality of water channels that extend outward radially to allow water to flow out while preventing soil from entering the reservoir;
a container interface structure comprising a mouth from the upper surface to the bottom end in the sidewall forming an opening into the reservoir, the mouth formed by a right leg and a left leg extending from the sidewall away from the reservoir, wherein each leg has an upper end connected to a horizontal ledge, wherein the right leg, the left leg and the horizontal ledge cooperate to form a seal between the reservoir and the container sidewall, and wherein the ledge has an upwardly extending circular collar;

a cylindrical pipe vertically and removably attachable to the collar; and a spacing tab positioned at the bottom end of the housing diametrically opposed to the container interface structure to urge the container interface structure towards the container sidewall, wherein an overflow orifice is defined at a predetermined height in the container sidewall, such that an air gap is formed below the upper surface of the housing.

18. The plant watering apparatus of claim 17, wherein the air gap is formed below the upper surface of the housing regardless of the amount of water poured into the plant container.

19. The plant watering apparatus of claim 17, wherein the plurality of openings defined in the upper surface comprise a pattern of alternating circular apertures and oblong slots.

20. The plant watering apparatus of claim 19, wherein the pattern of alternating circular apertures and oblong slots is selected to permit air from the air gap to move to soil in the plant container, and to permit excess water from the soil to drain interior the reservoir.

* * * * *